US012565097B2

(12) United States Patent　　　　　(10) Patent No.: US 12,565,097 B2
Igl et al.　　　　　　　　　　　　　　(45) Date of Patent:　　　　Mar. 3, 2026

(54) POWERTRAIN AND WORKING MACHINE

(71) Applicant: ZF Friedrichshafen AG,
Friedrichshafen (DE)

(72) Inventors: Stefan Igl, Vilshofen (DE); Thomas Oberbuchner, Traunstein (DE)

(73) Assignee: ZF Friedrichshafen AG,
Friedrichshafen (DE)

( * ) Notice: Subject to any disclaimer, the term of this patent is extended or adjusted under 35 U.S.C. 154(b) by 0 days.

(21) Appl. No.: 18/292,489

(22) PCT Filed: Jul. 22, 2022

(86) PCT No.: PCT/EP2022/070668
§ 371 (c)(1),
(2) Date: Jan. 26, 2024

(87) PCT Pub. No.: WO2023/006617
PCT Pub. Date: Feb. 2, 2023

(65) Prior Publication Data
US 2025/0042248 A1　　Feb. 6, 2025

(30) Foreign Application Priority Data
Jul. 30, 2021　(DE) ..................... 10 2021 208 277.7

(51) Int. Cl.
B60K 17/28　　　(2006.01)
B60K 17/02　　　(2006.01)
B60K 17/08　　　(2006.01)

(52) U.S. Cl.
CPC .............. B60K 17/28 (2013.01); B60K 17/02 (2013.01); B60K 17/08 (2013.01)

(58) Field of Classification Search
CPC ......... B60K 17/28; B60K 17/02; B60K 17/08
See application file for complete search history.

(56) References Cited

U.S. PATENT DOCUMENTS 4,116,090 A　*　9/1978　Zenker ................... F16H 3/085
　　　　　　　　　　　　　　　　　　　74/665 G
6,550,352 B2　　4/2003　Okada et al.
(Continued)

FOREIGN PATENT DOCUMENTS

CN　　　　103453120 A　　12/2013
DE　10 2011 110 258 A1　12/2011
(Continued)

OTHER PUBLICATIONS

German Patent Office, Search Report issued in German patent application No. 10 2021 208 277.7 (Mar. 18, 2022).
(Continued)

*Primary Examiner* — Jason D Shanske
*Assistant Examiner* — Scott Lawrence Strickler
(74) *Attorney, Agent, or Firm* — Finch & Maloney PLLC

(57)　　　　　　　ABSTRACT

The present invention relates to a powertrain (10) for a working machine, with a first electric machine (12) having a first drive output shaft (16) for providing drive power to the working machine and a second electric machine (14) having a second drive output shaft (24) for providing an auxiliary power take-off of the working machine. In addition, the powertrain (10) comprises a driving range transmission (18) with a countershaft (34). The driving range transmission (18) is designed to connect the first drive output shaft (16) to a driven axle (20) of the working machine, selectively either as a straight-through gear or, by way of a first gear ratio, by means of the countershaft (34). The second drive output shaft (24) is arranged coaxially with the countershaft (34). Furthermore, the invention relates to a working machine.

10 Claims, 1 Drawing Sheet

(56) References Cited

U.S. PATENT DOCUMENTS

| | | | |
|---|---|---|---|
| 8,887,589 B2 | 11/2014 | Ibamoto et al. | |
| 9,822,860 B2 | 11/2017 | Kaltenbach et al. | |
| 10,041,568 B2 | 8/2018 | Park et al. | |
| 10,844,935 B2 | 11/2020 | Wu et al. | |
| 10,968,994 B2 | 4/2021 | Mittelberger et al. | |
| 11,850,928 B2 | 12/2023 | Seemann et al. | |
| 2013/0276576 A1* | 10/2013 | Noguchi | B60K 6/442 |
| | | | 74/661 |
| 2015/0375750 A1 | 12/2015 | Toyota et al. | |
| 2021/0291648 A1 | 9/2021 | Reichert et al. | |
| 2022/0032755 A1* | 2/2022 | Seemann | B60K 17/16 |
| 2022/0396137 A1 | 12/2022 | Glockner et al. | |

FOREIGN PATENT DOCUMENTS

| | | | | |
|---|---|---|---|---|
| DE | 10 2015 208 825 A1 | 11/2016 | | |
| DE | 102018215924 A1 * | 3/2020 | | B60K 17/28 |
| DE | 10 2018 222 251 A1 | 6/2020 | | |
| JP | 2013-141875 A | 7/2013 | | |

OTHER PUBLICATIONS

European Patent Office, International Search Report issued in International patent application No. PCT/EP2022/070688 (Nov. 24, 2022).

European Patent Office, Written Opinion issued in International patent application No. PCT/EP2022/070688 (Nov. 24, 2022).

* cited by examiner

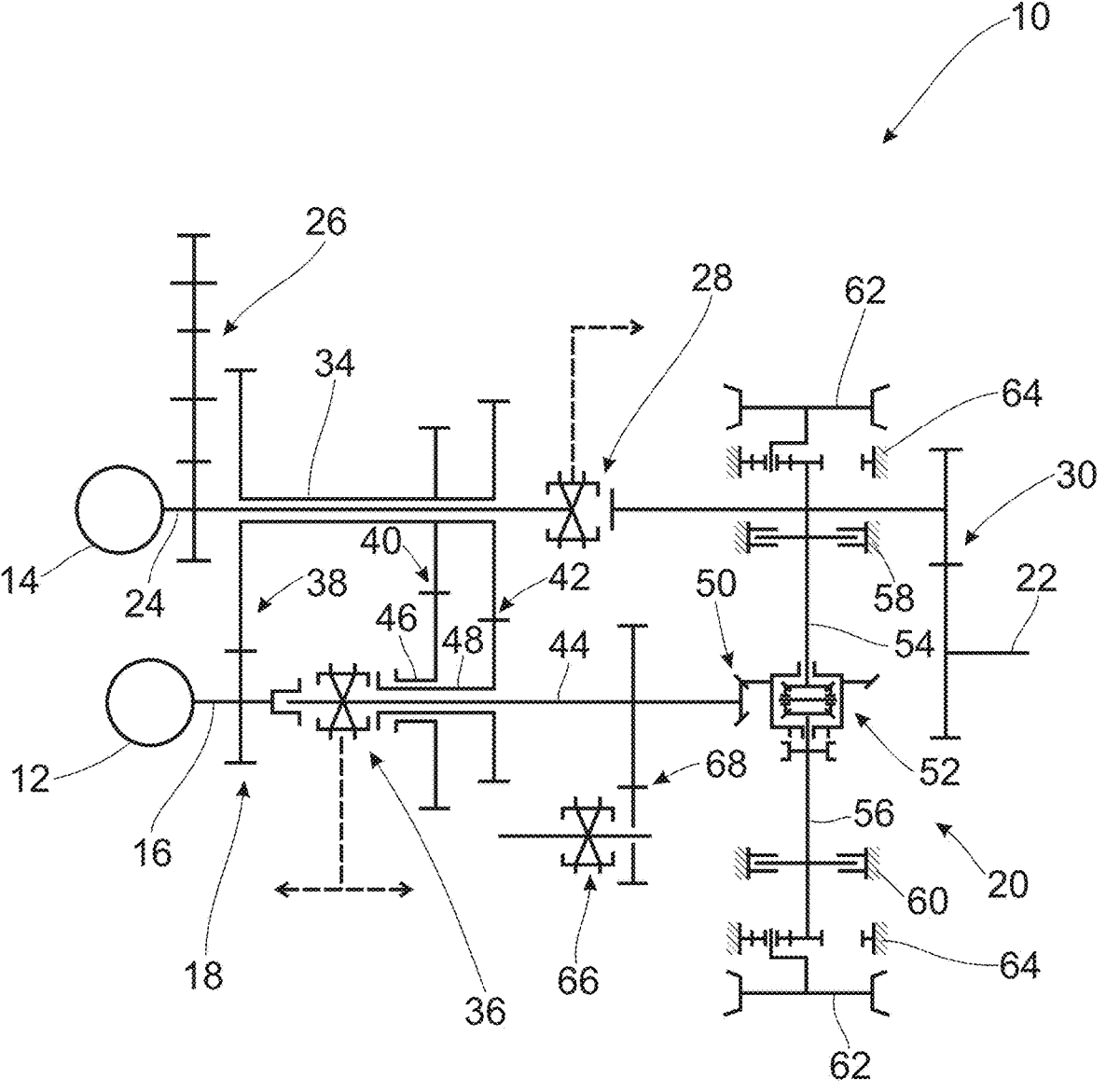

POWERTRAIN AND WORKING MACHINE

RELATED APPLICATIONS

This application claims the benefit under 35 U.S.C. § 371 as a U.S. National Phase Application of application no. PCT/EP2022/070668, fled on Jul. 7, 2022, which claims the benefit of German Patent Application no. 10 2021 208 277.7 filed on Jul. 30, 2021, the contents of which are hereby incorporated herein by reference in their entireties.

TECHNICAL FIELD

The present invention relates to a powertrain for a working machine. The invention also relates to a working machine.

BACKGROUND

Transmission systems for working machines are often very complex and expensive. For example, a hydrostatic power-split transmission can be provided in order to be able to produce a continuously variable gear ratio. Thanks to the power-splitting both a drive power and an auxiliary power take-off (PTO) can be delivered by a single internal combustion engine. The use of an electrified powertrain can achieve simplifications in such cases. However, when both different driving ranges and also an auxiliary power take-off (PTO) are desired, a large number of shafts and a large number of axle stitches are required. Because of that, the powertrain can be expensive and complicated.

SUMMARY

A first objective of the invention relates to a powertrain for a working machine. A powertrain can provide, for example, a drive power and, alternatively or in addition, an auxiliary power take-off. By means of the drive power the working machine can be driven. With the auxiliary power take-off, an implement of the working machine, such as an adjustable scoop or a hydraulic pump, can be supplied with power. The auxiliary power take-off can be a source of working power. The working machine can be an agricultural machine such as a tractor, a building machine, or even designed as a special vehicle.

The powertrain comprises a first electric machine which has a first drive output shaft for delivering drive power for the working machine.

The first electric machine can be designed, for example, to supply a drivetrain of the working machine with power. In addition, the powertrain comprises a second electric machine with a second drive output shaft for the provision of an auxiliary PTO for the working machine. The second electric machine can be designed, for example, to supply a working powertrain of the working machine with power. Thus, with this powertrain, a drive power and an auxiliary power take-off are provided by two separate electric machines. In that way, each of the electric machines can be designed and appropriately adapted for the desired operating range of the drive unit or of an implement, and each of the machines can be operated alternatively or additionally adapted. Accordingly, complex transmission components can largely be dispensed with. For example, it is no longer necessary for the power supplied by an internal combustion engine to be split by a transmission into an auxiliary power take-off with a particular rotation speed and a particular drive power. Instead, for example, the first electric machine can be operated with a desired rotation speed for driving the working machine, and the second electric machine can be operated with a desired rotation speed for some other consumer of the powertrain.

The powertrain can comprise an energy source for operating the two electric machines. For example, the powertrain can comprise a battery designed to supply electrical energy for the two electric machines. For example, a drive output shaft of one electric machine can be permanently connected to a rotor of the electric machine. An electric machine can be designed to transform electrical energy into mechanical energy. Optionally, an electric machine can also be designed for recuperation. For example, an electric machine can be designed as a synchronous motor or as an asynchronous motor.

Furthermore, the powertrain comprises a driving range transmission with a countershaft. With the driving range transmission various gear ratios can be engaged between the first drive output shaft and a driven axle of the working machine. In that way, the full extent of the usable driving range provided by the working machine can be enlarged. Thus, the working machine can drive at particularly high or even particularly low speeds without the first electric machine thereby having to be operated in an inefficient operating condition. The countershaft can be a shaft on which the respective gearwheels of different spur gear assemblies, which can for example be associated with different gear ratios, are arranged. The countershaft can be arranged parallel to the first drive output shaft or as a hollow shaft coaxially with the power take-off shaft.

The driving range transmission is designed to connect the first drive output shaft with at least one driven axle of the working machine, selectively either as a straight-through gear, or via a gear ratio by way of the countershaft. A straight-through gear can be a gear ratio in which a drive output shaft rotates at the same rotation speed as a drive input shaft. For the straight-through gear, a drive input shaft can be arranged coaxially with and connected rotationally fixed to a drive output shaft. Here, the same rotation speed is understood to mean that two components rotate at the sane rotation speed or at rotation speeds which are only slightly different due to slippage. If the straight-through gear has been selected in the driving range transmission, the first drive output shaft can, for example, be connected rotationally fixed to an input shaft of a differential of the at least one driven axle. Alternatively, or in addition, if the straight-through gear has been selected, then a drive input shaft of the driving range transmission can be connected rotationally fixed to a drive output shaft of the driving range transmission. The drive input shaft and the drive output shaft of the driving range transmission can be arranged coaxially, for example in the axial direction one after the other. The straight-through gear can be a gear ratio with a transmission ratio of one.

By virtue of the gear ratio, a torque can be transmitted from the drive input shaft of the driving range transmission to the drive output shaft of the driving range transmission via one or more spur gear assemblies. In such a case, corresponding shafts are functionally connected with one another by mechanical means. The rotation speeds of the shafts connected to one another are unequal. The first gear ratio can provide a gear ratio other than that of the straight-through gear. By means of the countershaft the first gear ratio can be provided by simple mechanical means. The second drive output shaft is arranged coaxially with the countershaft. For example, the countershaft can be in the form of a hollow shaft which is arranged at least in part radially outside the second drive output shaft. The second drive output shaft can extend through the countershaft. Since the second drive output shaft is arranged coaxially with the countershaft, in the powertrain there is a smaller number of axle stitches. In that way a housing of the driving range transmission and, alternatively or in addition, a housing of the powertrain can be simple and inexpensive to produce. Furthermore, there are few bearing points, whereby the cost can also be low.

The driving range transmission can comprise a transmission drive input shaft and a transmission drive output shaft, which correspond, for example, to the drive input shaft and the drive output shaft of the driving range transmission. The transmission drive output shaft can be mechanically functionally connected to the at least one driven axle, for example permanently attached rotationally fixed thereto. The transmission drive input shaft can be connected to the first drive output shaft, for example permanently attached rotationally fixed thereto. Each gear ratio of the driving range transmission, which can also include the straight-through gear, can be selected by means of a shifting element of the driving range transmission. By actuating the shifting element, for example a gear of the driving range transmission can be selected. The particular gear ratio can produce a fixed ratio between an input rotation speed and an output rotation speed of the driving range transmission.

An axle of the powertrain can be a vehicle axle of the working machine. A driven axle can be an axle of the working machine which can be supplied with drive power by means of the powertrain. In a very simple design, the driven axle can be a shaft which is connected to the transmission drive output shaft of the driving range transmission via a bevel gear or even directly to the transmission drive output shaft of the driving range transmission. An axle can support the wheels of the working machine. For example, a wheel can be arranged at each end of the driven axle, such that the working machine rests with those wheels on a subsurface. In addition, the working machine can have respective non-driven axles. The at least one driven axle can for example be a rear axle of the working machine. Furthermore, the powertrain can be designed to drive further axles of the working machine, such as a front axle.

In the first gear ratio, for example, the transmission drive input shaft can be functionally connected mechanically via a spur gear assembly to the countershaft and the countershaft via a further spur gear assembly to the transmission drive output shaft. In the straight-through gear, in contrast, the torque transmission between the transmission drive input shaft and the transmission drive output shaft involves no spur gears.

The powertrain can provide two mechanical powers by means of independent electric machines. This allows the drivetrain and the work strand to be dimensioned and scaled appropriately for the power involved in each case. Respective gear ratios are provided by mechanically simple means, so that the power train is compact and inexpensive. This takes advantage of the fact that the electric machines can already be adapted for the respective powers desired, so that there is correspondingly no need for adaptation by virtue of a complex transmission.

In an embodiment of the powertrain, it is provided that the driving range transmission is designed to connect the first drive output shaft to the at least one driven axle of the working machine, selectively either as a straight-through gear, or via a first gear ratio by way of the countershaft, or via a second gear ratio via the countershaft. The driving range transmission can be designed to provide at least three gear ratios. The second gear ratio can provide a gear ratio different from those of the straight-through gear and the first gear ratio. The first and the second gear ratios both use the countershaft for torque transmission. In that way the number of spur gear assemblies, shafts and axle stitches required can be kept small. Moreover, in that way the driving range transmission can be particularly compact and requires few bearings. For example, in the first gear ratio, torque transmission involves at least one more spur gear assembly than in the second gear ratio.

The shifting element of the driving range transmission can be designed, for example, such that it selects a functional mechanical connection as the straight-through gear via the first gear ratio or via the second gear ratio. Correspondingly, the shifting element can have at least three shift positions. In addition, for safety reasons it can have a neutral position in order to decouple the first electric machine from the driven axle. Alternatively, however, the neutral position can be omitted. In that case, for example, an electric machine is particularly suitable for the drivetrain which does not induce any voltage during a rotation imposed from outside, for example by rolling the working machine.

In an embodiment of the powertrain, it is provided that the powertrain comprises a first spur gear assembly which is designed to connect the second drive output shaft to a pump drive. The first spur gear assembly can be designed to bridge an axis offset between a drive input shaft of the pump drive and the second drive output shaft. Alternatively, or in addition, the first spur gear assembly can provide a gear ratio between the second drive output shaft and the drive input shaft of the pump drive. In that way the second electric machine can be designed differently, for example for higher or lower rotation speeds than desired for the pump drive. This can have fitting-space advantages. The powertrain can include the pump drive. The pump drive can be permanently connected to the second drive output shaft, or mechanically functionally connected to it in a shiftable manner by way of the first spur gear assembly. For example, the shiftable connection can be provided when the second electric machine also has to supply auxiliary drive power to consumers other than the pump drive as well. This can prevent the pump drive from being supplied with power when not necessary but when other consumers require auxiliary drive power. Alternatively, or in addition, it can be made possible to connect some other consumers shiftably to the second drive output shaft. The spur gear assembly can for example comprise two gearwheels that mesh with one another. The first spur gear assembly can also comprise, for example, three pair of gearwheels that mesh with one another.

In an embodiment of the powertrain, it is provided that the powertrain comprises a PTO shaft and a second spur gear assembly. The PTO shaft can be designed to transmit auxiliary drive power to an external consumer, such as an agricultural trailer attachment. The second spur gear assembly can provide a gear ratio between the second drive output shaft and the PTO shaft. Alternatively, the second drive output shaft can be the PTO shaft itself or connected or connectable rotationally fixed thereto. The second drive output shaft and the first drive output shaft can be matched to one another in such manner that the pump drive and the PTO shaft rotate at different rotation speeds. A torque can be transmitted via the second spur gear assembly in the axial direction toward the at least one driven axle, bypassing the PTO shaft. Thus, the PTO shaft can be arranged coaxially with the first drive output shaft and the transmission output shaft. The second spur gear assembly can enable an axial offset to exist between the PTO shaft and the second drive output shaft. For example, the PTO shaft can be accessible at the rear of the working machine and can bypass the driven axle. The second drive output shaft can be permanently mechanically functionally connected to the PTO shaft via the second spur gear assembly.

In an embodiment of the powertrain, it is provided that the powertrain comprises a first clutch such that the second drive output shaft can be connected to the second spur gear assembly by means of the first clutch. If no second spur gear assembly is provided, then the first clutch can also connect the second drive output shaft to the PTO shaft. The first clutch can be a shifting element. The clutch can be of the interlocking or of the frictional type. A powershiftable first clutch can be designed as a multiple-disk clutch. By means of the first clutch the PTO shaft and alternatively or in addition the second spur gear assembly can be decoupled from the second drive output shaft. In that way losses are reduced when the pump drive is operated but not when a consumer is operated by the PTO shaft. The possibility to decouple the drive output shaft from the PTO shaft may be required on the grounds of standards and guidelines.

In an embodiment of the powertrain, it is provided that the powertrain has a second clutch, such that a further driven axle can be mechanically functionally connected to the first drive output shaft by the second clutch. In that way, an all-wheel drive or multi-axle drive can be engaged and disengaged, as necessary. Alternatively, the further driven axle can be permanently connected to the first drive output shaft, and in that case the all-wheel drive or multi-axle drive, can be provided inexpensively. The further driven axle can be a front axle, for example. The further driven axle can be made like the other driven axle. One of the driven axles can be steerable in order to control the working machine. The first drive output shaft can be mechanically functionally connected to the second clutch by means of a spur gear assembly.

In an embodiment of the powertrain, it is provided that the driving range transmission comprises a shifting element. The shifting element can be designed to shift between the straight-through gear, the first gear ratio and optionally the second gear ratio. The shifting element can be a frictional or an interlocking clutch. For example, the shifting element can comprise an axially displaceable sleeve.

In the first and second gears the first drive output shaft can be mechanically functionally connected to the countershaft by way of a first spur gear assembly. In the first gear the countershaft can be mechanically functionally connected to the driven axle by means of a second spur gear assembly. In the second gear the countershaft can be mechanically functionally connected to the driven axle by means of a third spur gear assembly. This gives a compact, inexpensive, and simple driving range transmission. In the straight-through gear the countershaft can be decoupled from the first drive output shaft. Alternatively, the second and third spur gear assemblies can be decoupled from driven axle.

In an embodiment of the powertrain, it is provided that the shifting element is in the form of an interlocking clutch, which can at least be shifted between the three shift positions. Optionally, the shifting element can have a further shift position in which no connection is formed between any two components. This is the neutral position. The clutch can be synchronized for shifting by the first electric machine. For shifting, the working machine can roll under no load. All the driving ranges can begin at 0 km/h, so that shifting is even possible from a standstill. In contrast to an internal combustion engine, this electric machine can usually deliver power already at a rotation speed of zero. Moreover, a brief overload for starting off in a higher gear is possible without damage.

In an embodiment of the powertrain, it is provided that the driving range transmission comprises a first hollow shaft for producing the first gear ratio and a second hollow shaft for producing the second gear ratio. The first and second hollow shafts can be arranged coaxially with the straight-through gear and alternatively or in addition the transmission drive output shaft and alternatively or in addition the first drive output shaft. This makes the powertrain compact and involves only a small number of axle stitches. For example, a spur gearwheel of the second spur gear assembly can be arranged on the first hollow shaft and a spur gearwheel of the third spur gear assembly on the second hollow shaft. The two hollow shafts can be nested one inside the other. The two hollow shafts can be arranged radially outside a transmission drive output shaft.

In an embodiment of the powertrain, it is provided that at least one driven axle has a differential with two output shafts. A drive input shaft of the differential can be connected to the transmission drive output shaft, for example permanently and rotationally fixed. The at least one driven axle can be designed to provide an additional gear ratio between the output shafts and the wheels concerned. For this, a gear system, for example in the form of a spur gear assembly or a planetary gearset, can be provided between the output shaft concerned and the wheel of the working machine that is mechanically functionally connected thereto. However, in all the designs commonly available on the market, the differential can be in the form of an open self-locking or emergency locking structure by virtue of differential locks. The driven axle can have a brake on each side or on each output shaft of the differential. The brakes can be in the form of service brakes. For example, the brakes can fix an output shaft of the differential to a housing. Each side of the axle can correspond to a respective end.

A second aspect of the invention relates to a working machine with a powertrain according to the first aspect. Further features, embodiments and advantages emerge from the description of the first aspect. Conversely, features, embodiments, and advantages of the second aspect are also features, embodiments and advantages of the first aspect. The working machine can be an agricultural machine. The powertrain is particularly suitable for an electrically operated low-power tractor, such as a street cleaning vehicle.

BRIEF DESCRIPTION OF THE FIGURES

FIG. 1 is the sole FIGURE in the application and shows a schematic illustration of a powertrain for a working machine, in accordance with an embodiment of the disclosure.

DETAILED DESCRIPTION OF EMBODIMENTS

FIG. 1 shows a schematic illustration of a powertrain 10 for a working machine. The powertrain 10 comprises a first electric machine 12 and a second electric machine 14. A first drive output shaft 16 of the first electric machine 12 is connected to a driving range transmission 18 of the powertrain 10. The first electric machine 12 is designed to provide drive power for driving the working machine. The driving range transmission 18 is designed to transmit a drive power supplied by the first electric machine 12 to the first driven axle 20 of the working machine. The second electric machine 14 is designed to provide a PTO shaft with power for the working machine. The PTO shaft power is used for a pump drive of the powertrain 10 and to supply power to a PTO shaft 22 of the working machine. The pump drive can provide part of the power produced by the second electric machine 14 for a transmission pump and for alternative or additional working hydraulic pumps. From the pump drive hydraulic auxiliary power can be taken off. The pump drive is not provided in another embodiment.

A second drive output shaft 24 of the second electric machine 14 is permanently mechanically functionally connected to the pump drive by way of a first spur gear assembly 26. In the embodiment without a pump drive, the first spur gear assembly 26 is not provided. Furthermore, the second drive output shaft 24 can be mechanically functionally connected to a second spur gear assembly 30 by way of a first clutch 28. The second spur gear assembly 30 connects the second drive output shaft 24 to the PTO shaft 22. By means of the first clutch 28 a mechanical functional connection between the second drive output shaft 24 and the PTO shaft 22 can be opened and closed. Thus, unnecessary slip losses can be avoided when an auxiliary power take-off to the PTO shaft is not needed. The second spur gear system 30 makes it possible to arrange the PTO shaft 22 in the axial direction behind the first driven axle 20, whereas the second electric machine 14 is arranged axially before the first driven axle 20. Since the auxiliary PTO is powered by the second electric machine 14, there is no need for a starter clutch for the PTO shaft 22. The clutch 28 is a simple switching sleeve with only two shift positions. In a different embodiment the clutch 28 is designed to be powershiftable.

The two electric machines 12, 14 are decoupled from one another. Thus, both for a driving power and also for an auxiliary PTO, a characteristic of the electric machines 12, 14 relating to torque-rotation speed spread can be used to the full. There is no need for a multi-stage PTO shaft transmission. Instead, only the simple second spur gear assembly 30 is provided Despite that, PTO shaft rotation speeds typical of those on the market can be realized by the second spur gear assembly 30 thanks to a large spread of the second electric machine 14.

The driving range transmission 18 comprises a countershaft 34. The countershaft 34 is arranged coaxially with the second drive output shaft 24 and therefore with a rotation axis of the second electric machine 14. In that way the driving range transmission 18 has a small number of axle stitches and is also very compact. The driving range transmission 18 comprises a shifting element 36. In addition, the driving range transmission 18 comprises a first spur gear assembly 38, a second spur gear assembly 40 and a third spur gear assembly 42. The first drive output shaft 16 is mechanically functionally connected to the countershaft 34 by way of the first spur gear assembly 34. The first drive output shaft 16 also constitutes a transmission input shaft for the driving range transmission 18.

The shifting element 36 has four shift positions and is in the form of a stand-alone mechanical shifting element. The shifting element 36 is of the interlocking type. In another embodiment the shifting element 36 is of the frictional type and enables powershifting. In a first shift position the shifting element 36 connects the first drive output shaft 16 to a transmission output shaft 44 of the driving range transmission 18. In the first shift position a straight-through gear is selected for the driving range transmission 18. Thereby, the first drive output shaft 16 is connected rotationally fixed to the transmission output shaft 44 so that the first drive output shaft 16 and the transmission output shaft 44 rotate at the same speed. The straight-through gear delivers very high mechanical efficiency. In the first shift position and therefore the straight-through gear, the gear ratio is higher than in other gears, in order to enable efficient driving at high speeds. The first drive output shaft 16 and the transmission output shafts 44 are arranged coaxially and one after the other, namely on either side of the shifting element 36.

In a second shift position the shifting element 36 separates the direct connection of the first drive output shaft 16 and the transmission output shaft 44. Instead, the second spur gear assembly 40 is connected to the transmission output shaft 44 for torque transmission. For that purpose, the shifting element 36 couples a first hollow shaft 46, which is permanently connected rotationally fixed to a spur gear of the second spur gear assembly 40, to the transmission output shaft 44. This provides a first gear ratio through the driving range transmission 18. In this first gear ratio, a torque is transmitted to the transmission output shaft 44 by way of the first drive output shaft 16, the first spur gear assembly 38, the countershaft 34, the second spur gear assembly 40, and the first hollow shaft 44.

In a third shift position, the direct connection between the first drive output shaft 16 and the transmission output shaft 44 remains separated. Instead of the second spur gear assembly 40 the third spur gear assembly 42 is connected to the transmission output shaft 44 for torque transmission. For that purpose, the shifting element 36 couples a second hollow shaft 48, which is permanently connected to a spur gearwheel of the third spur gear assembly 42, to the transmission output shaft 44. In contrast, the first hollow shaft 46 is decoupled from the transmission output shaft 44. Thus, a second gear ratio is provided through the driving range transmission 18. In this second gear ratio, a torque is transmitted from the first electric machine 12 to the transmission output shaft 44 by way of the first drive output shaft 16, the first spur gear assembly 38, the countershaft 34, the third spur gear assembly 42, and the second hollow shaft 48. The second hollow shaft 48 is arranged coaxially with and radially inside the first hollow shaft 46. The third gear ratio 42 is arranged axially behind the second gear ratio step 40, i.e., facing away from the electric machines 12, 14.

Furthermore, the shifting element 36 can have a neutral shift position. In the neutral shift position, the first drive output shaft 16 is separated from the transmission output shaft 44 so that no torque is transmitted from the first electric machine 12 via the driving range transmission 18 to any of the driven axles of the working machine.

The transmission output shaft 44 is permanently mechanically functionally connected to an input shaft of a differential 52 of the first driven axle 20. The differential has a first output shaft 54 and a second output shaft 56. Each of the two output shafts 54, 56 can be braked by means of an associated brake 58, 60. On each side the first driven axle 20 has a driven wheel 62. The respective driven wheels 62 are mechanically functionally connected by means of a planetary gearset 64, respectively, to one of the two output shafts 54, 56 of the differential 52 of the first driven axle 20.

The powertrain 10 has a second clutch 66, which is mechanically functionally connected via a further spur gear assembly 68 to the transmission output shaft 44. The second clutch 66 is in the form of a claw-type shifting element. In another variant, the second clutch 66 can be powershiftable and frictional. By means of the second clutch 66, a further driven axle (not shown in FIG. 1) can be mechanically functionally connected to the transmission output shaft 44. Thus, torque transmission can correspondingly take place from the first electric machine 12 to the further driven axle in a shiftable manner.

INDEXES

10 Powertrain
12 First electric machine
14 Second electric machine
16 First drive output shaft
18 Driving range transmission
20 First driven axle
22 Power take-off (PTO) shaft
24 Second drive output shaft
26 First spur gear assembly
28 First clutch
30 Second spur gear assembly
34 Countershaft
36 Shifting element
38 First spur gear assembly
40 Second spur gear assembly
42 Third spur gear assembly
44 Transmission output shaft
46 First hollow shaft
48 Second hollow shaft
50 Bevel gear drive
52 Differential
54 First output shaft
56 Second output shaft
58, 60 Brakes
62 Driven wheel
64 Planetary gearset
66 Second clutch
68 Spur gear assembly

The invention claimed is:

1. A powertrain for a working machine, comprising:
a first electric machine having a first drive output shaft for providing drive power for the working machine;
a second electric machine having a second drive output shaft for providing power for an auxiliary power take-off of the working machine; and
a driving range transmission with a countershaft, a first hollow shaft for producing a first gear ratio, and a second hollow shaft for producing the second gear ratio, and a transmission output shaft that forms a differential input shaft, wherein the first hollow shaft, the second hollow shaft, and the transmission output shaft are arranged coaxially and the second hollow shaft is nested within the first hollow shaft and the transmission output shaft is nested within the second hollow shaft;
wherein the driving range transmission is configured to selectively connect mechanically and functionally the first drive output shaft to the transmission output shaft and at least one driven axle of the working machine, the first drive output shaft is directly connectable to the transmission output shaft as a straight-through gear; and the first drive output shaft is connectable to the transmission output shaft by way of the first and the second gear ratios via the countershaft; and
wherein the second drive output shaft is arranged coaxially with and nested with the countershaft.

2. The powertrain according to claim 1, wherein the driving range transmission is configured to mechanically and functionally connect the first drive output shaft to the at least one driven axle of the working machine as the straight-through gear, as the first gear ratio via the countershaft, and as the second gear ratio via the countershaft independent of each other.

3. The powertrain according to claim 1, comprising a first spur gear assembly configured to connect the second drive output shaft to a pump drive.

4. The powertrain according to claim 1, comprising a power take-off shaft and a second spur gear assembly, wherein the second drive output shaft is connectable, via the second spur gear assembly in an axial direction, bypassing the at least one driven axle, to transmit torque to the power take-off shaft.

5. The powertrain according to claim 4, comprising a first clutch, and wherein the second drive output shaft is connected to the second spur gear assembly by engagement of the first clutch such that the second drive output shaft and an input of the second spur gear assembly coaxially rotate in unison.

6. The powertrain according to claim 1, comprising a second clutch, wherein the first drive output shaft is configured to be connected mechanically and functionally to a further driven axle by means of the second clutch.

7. The powertrain according to claim 1, wherein the driving range transmission comprises a shifting element, and the countershaft has first, second and third fixed spur gears, the first drive output shaft has a fixed gear that meshes with the first fixed spur gear of the countershaft, the first hollow shaft has a spur gear that meshes with the second fixed gear of the countershaft, and the second hollow shaft has a spur gear that meshes with the third fixed spur gear of the countershaft, the shifting element is shiftable to shift between the straight-through gear, the first gear ratio, and the second gear ratio, wherein,
in the first gear ratio, the shifting element couples the first hollow shaft to the transmission output shaft and to the at least one driven axle; and
in the second gear ratio, the shifting element couples the second hollow shaft to the transmission output shaft and to the at least one driven axle.

8. The powertrain according to claim 7, wherein the shifting element is in the form of a claw-type clutch which is shiftable between at least the three shift positions.

9. The powertrain according to claim 1, wherein the at least one driven axle comprises a differential with two output shafts, and the at least one driven axle is configured to provide an additional gear ratio between the two output shafts of the differential and respective wheels.

10. A working machine with the powertrain according to claim 1.

* * * * *